US012236971B2

(12) United States Patent
Usher et al.

(10) Patent No.: US 12,236,971 B2
(45) **Date of Patent: *Feb. 25, 2025**

(54) METHOD AND DEVICE FOR SPECTRAL EXPANSION OF AN AUDIO SIGNAL

(71) Applicant: ST R&DTEch, LLC

(72) Inventors: John Usher, Beer (GB); Dan Ellis, New York City, NY (US)

(73) Assignee: ST R&DTech LLC, Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,655

(22) Filed: Jan. 13, 2023

(65) Prior Publication Data

US 2023/0142711 A1 May 11, 2023

Related U.S. Application Data

(63) Continuation of application No. 16/783,624, filed on Feb. 6, 2020, now Pat. No. 11,605,395, which is a continuation of application No. 16/047,612, filed on Jul. 27, 2018, now Pat. No. 10,622,005, which is a continuation of application No. 14/155,724, filed on Jan. 15, 2014, now Pat. No. 10,043,535.

(60) Provisional application No. 61/752,569, filed on Jan. 15, 2013, provisional application No. 61/920,321, filed on Dec. 23, 2013.

(51) Int. Cl.

| | |
|---|---|
| ***G10L 21/04*** | (2013.01) |
| ***G10L 21/0388*** | (2013.01) |
| ***H04R 3/00*** | (2006.01) |
| *H04R 1/02* | (2006.01) |
| *H04R 1/10* | (2006.01) |
| *H04R 5/033* | (2006.01) |

(52) U.S. Cl.

CPC ............ *G10L 21/0388* (2013.01); *H04R 3/00* (2013.01); *H04R 1/028* (2013.01); *H04R 1/1083* (2013.01); *H04R 5/033* (2013.01); *H04R 2420/07* (2013.01)

(58) Field of Classification Search

CPC ........ H04R 25/00; H04R 25/604; G10L 21/04

See application file for complete search history.

(56) References Cited

U.S. PATENT DOCUMENTS 4,773,095 A * 9/1988 Zwicker ............... H04R 25/407 381/313
5,978,759 A 11/1999 Tsushima et al.
6,289,311 B1 9/2001 Omori et al.

(Continued)

*Primary Examiner* — Daniel Abebe

(74) *Attorney, Agent, or Firm* — Akerman LLP; Peter A. Chiabotti; David Fernandez-Fidalgo

(57) ABSTRACT

A method and device for automatically increasing the spectral bandwidth of an audio signal including generating a "mapping" (or "prediction") matrix based on the analysis of a reference wideband signal and a reference narrowband signal, the mapping matrix being a transformation matrix to predict high frequency energy from a low frequency energy envelope, generating an energy envelope analysis of an input narrowband audio signal, generating a resynthesized noise signal by processing a random noise signal with the mapping matrix and the envelope analysis, high-pass filtering the resynthesized noise signal, and summing the high-pass filtered resynthesized noise signal with the input narrowband audio signal. Other embodiments are disclosed.

17 Claims, 7 Drawing Sheets

Overview of Spectral Expansion System

(56) References Cited

U.S. PATENT DOCUMENTS

| | | | | |
|---|---|---|---|---|
| 6,681,202 | B1 | 1/2004 | Miet | |
| 6,683,965 | B1 | 1/2004 | Sapiejewski | |
| 6,829,360 | B1 | 12/2004 | Iwata et al. | |
| 6,895,375 | B2 | 5/2005 | Malah et al. | |
| 7,181,402 | B2 | 2/2007 | Jax et al. | |
| 7,233,969 | B2 | 6/2007 | Rawlins et al. | |
| 7,397,867 | B2 | 7/2008 | Moore et al. | |
| 7,433,481 | B2 * | 10/2008 | Armstrong ........... | H04R 25/407 381/313 |
| 7,433,910 | B2 | 10/2008 | Rawlins et al. | |
| 7,454,453 | B2 | 11/2008 | Rawlins et al. | |
| 7,546,237 | B2 | 6/2009 | Nongpiur et al. | |
| 7,599,840 | B2 | 10/2009 | Mehrotra et al. | |
| 7,693,709 | B2 | 4/2010 | Thumpudi et al. | |
| 7,727,029 | B2 | 6/2010 | Bolin et al. | |
| 7,756,281 | B2 | 7/2010 | Goldstein et al. | |
| 7,792,680 | B2 | 9/2010 | Iser et al. | |
| 7,831,434 | B2 | 11/2010 | Mehrotra et al. | |
| 7,953,604 | B2 | 5/2011 | Mehrotra et al. | |
| 7,991,815 | B2 | 8/2011 | Rawlins et al. | |
| 8,047,207 | B2 | 11/2011 | Perez et al. | |
| 8,090,120 | B2 | 1/2012 | Seefeldt | |
| 8,162,697 | B1 | 4/2012 | Menolotto et al. | |
| 8,190,425 | B2 | 5/2012 | Mehrotra et al. | |
| 8,194,864 | B2 | 6/2012 | Goldstein et al. | |
| 8,199,919 | B2 | 6/2012 | Goldstein et al. | |
| 8,199,933 | B2 | 6/2012 | Seefeldt | |
| 8,200,499 | B2 | 6/2012 | Nongpiur et al. | |
| 8,206,181 | B2 | 6/2012 | Steijner | |
| 8,208,644 | B2 | 6/2012 | Goldstein et al. | |
| 8,208,652 | B2 | 6/2012 | Keady | |
| 8,221,861 | B2 | 7/2012 | Keady | |
| 8,229,128 | B2 | 7/2012 | Keady | |
| 8,251,925 | B2 | 8/2012 | Keady et al. | |
| 8,312,960 | B2 | 11/2012 | Keady | |
| 8,332,210 | B2 | 12/2012 | Nilsson et al. | |
| 8,358,617 | B2 | 1/2013 | E-Maleh et al. | |
| 8,386,243 | B2 | 2/2013 | Nilsson et al. | |
| 8,437,482 | B2 | 5/2013 | Seefeldt et al. | |
| 8,437,492 | B2 | 5/2013 | Goldstein et al. | |
| 8,484,020 | B2 | 7/2013 | Krishnan | |
| 8,550,206 | B2 | 10/2013 | Keady et al. | |
| 8,554,350 | B2 | 10/2013 | Keady et al. | |
| 8,554,569 | B2 | 10/2013 | Chen et al. | |
| 8,600,067 | B2 | 12/2013 | Usher et al. | |
| 8,631,801 | B2 | 1/2014 | Keady | |
| 8,639,502 | B1 | 1/2014 | Boucheron et al. | |
| 8,657,064 | B2 | 2/2014 | Staab et al. | |
| 8,678,011 | B2 | 3/2014 | Goldstein et al. | |
| 8,682,010 | B2 * | 3/2014 | Macours ................. | H04S 7/306 381/74 |
| 8,718,313 | B2 | 5/2014 | Keady | |
| 8,731,923 | B2 | 5/2014 | Shu | |
| 8,771,021 | B2 | 7/2014 | Edeler et al. | |
| 8,831,267 | B2 | 9/2014 | Annacone | |
| 8,848,939 | B2 | 9/2014 | Keady et al. | |
| 8,917,880 | B2 | 12/2014 | Goldstein et al. | |
| 8,992,710 | B2 | 3/2015 | Keady | |
| 9,113,267 | B2 | 8/2015 | Usher et al. | |
| 9,123,323 | B2 | 9/2015 | Keady | |
| 9,138,353 | B2 | 9/2015 | Keady | |
| 9,185,481 | B2 | 11/2015 | Goldstein et al. | |
| 9,216,237 | B2 | 12/2015 | Keady | |
| 9,539,147 | B2 | 1/2017 | Keady et al. | |
| 9,757,069 | B2 | 9/2017 | Keady et al. | |
| 9,781,530 | B2 | 10/2017 | Usher et al. | |
| 9,843,854 | B2 | 12/2017 | Keady | |
| 10,012,529 | B2 | 7/2018 | Goldstein et al. | |
| 10,190,904 | B2 | 1/2019 | Goldstein et al. | |
| 10,783,904 | B2 * | 9/2020 | Bouserhal .............. | H04R 3/005 |
| 2002/0116196 | A1 | 8/2002 | Tran | |
| 2003/0093279 | A1 | 5/2003 | Malah | |
| 2004/0076305 | A1 | 4/2004 | Santiago | |
| 2004/0138876 | A1 | 7/2004 | Kallio et al. | |
| 2005/0004803 | A1 | 1/2005 | Smeets et al. | |
| 2005/0049863 | A1 | 3/2005 | Gong et al. | |
| 2006/0190245 | A1 | 8/2006 | Iser | |
| 2007/0055519 | A1 | 3/2007 | Seltzer et al. | |
| 2007/0078649 | A1 | 4/2007 | Hetherington et al. | |
| 2007/0150269 | A1 | 6/2007 | Nongpiur et al. | |
| 2007/0237342 | A1 | 10/2007 | Agranat | |
| 2008/0031475 | A1 | 2/2008 | Goldstein | |
| 2008/0037801 | A1 | 2/2008 | Alves | |
| 2008/0208575 | A1 | 8/2008 | Laaksonen | |
| 2008/0219456 | A1 | 9/2008 | Goldstein | |
| 2008/0300866 | A1 | 12/2008 | Mukhtar | |
| 2009/0048846 | A1 | 2/2009 | Smaragdis et al. | |
| 2009/0071487 | A1 | 3/2009 | Keady | |
| 2009/0129619 | A1 | 5/2009 | Nordahn | |
| 2009/0296952 | A1 | 12/2009 | Pantfoerder et al. | |
| 2010/0074451 | A1 | 3/2010 | Usher et al. | |
| 2010/0158269 | A1 | 6/2010 | Zhang | |
| 2010/0241256 | A1 | 9/2010 | Goldstein et al. | |
| 2010/0246831 | A1 | 9/2010 | Mahabub et al. | |
| 2011/0005828 | A1 | 1/2011 | Ye et al. | |
| 2011/0019838 | A1 | 1/2011 | Kaulberg et al. | |
| 2011/0112845 | A1 | 5/2011 | Jasiuk et al. | |
| 2011/0188669 | A1 | 8/2011 | Lu | |
| 2011/0282655 | A1 | 11/2011 | Endo | |
| 2011/0293105 | A1 * | 12/2011 | Arie ..................... | H04R 1/1083 381/151 |
| 2012/0046946 | A1 | 2/2012 | Shu | |
| 2012/0121220 | A1 | 5/2012 | Krummrich | |
| 2012/0128165 | A1 | 5/2012 | Visser et al. | |
| 2012/0215519 | A1 | 8/2012 | Park et al. | |
| 2012/0321097 | A1 | 12/2012 | Braho | |
| 2013/0013300 | A1 | 1/2013 | Otani | |
| 2013/0024191 | A1 | 1/2013 | Krutsch | |
| 2013/0039512 | A1 | 2/2013 | Miyata et al. | |
| 2013/0052873 | A1 | 2/2013 | Riezebos et al. | |
| 2013/0244485 | A1 | 3/2013 | Lam et al. | |
| 2013/0098706 | A1 | 4/2013 | Keady | |
| 2013/0108064 | A1 | 5/2013 | Kocalar et al. | |
| 2013/0149192 | A1 | 6/2013 | Keady | |
| 2013/0195283 | A1 | 8/2013 | Larson et al. | |
| 2013/0210286 | A1 | 8/2013 | Golko | |
| 2013/0322653 | A1 | 12/2013 | Tsai et al. | |
| 2013/0339025 | A1 * | 12/2013 | Suhami ................. | G10L 21/003 704/271 |
| 2014/0003644 | A1 | 1/2014 | Keady et al. | |
| 2014/0026665 | A1 | 1/2014 | Keady | |
| 2014/0072156 | A1 | 3/2014 | Kwon | |
| 2014/0321673 | A1 | 10/2014 | Seo et al. | |
| 2014/0373854 | A1 | 12/2014 | Keady | |
| 2015/0117663 | A1 | 4/2015 | Hsu et al. | |
| 2015/0156584 | A1 | 6/2015 | Chen et al. | |
| 2015/0358719 | A1 | 12/2015 | Mackay et al. | |
| 2016/0015568 | A1 | 1/2016 | Keady | |
| 2016/0192077 | A1 | 6/2016 | Keady | |
| 2016/0295311 | A1 | 10/2016 | Keady et al. | |
| 2017/0134865 | A1 | 5/2017 | Goldstein et al. | |
| 2018/0054668 | A1 | 2/2018 | Keady | |
| 2018/0132048 | A1 | 5/2018 | Usher et al. | |
| 2018/0220239 | A1 | 8/2018 | Keady et al. | |
| 2019/0082272 | A9 | 3/2019 | Goldstein et al. | |

* cited by examiner

14

16

40

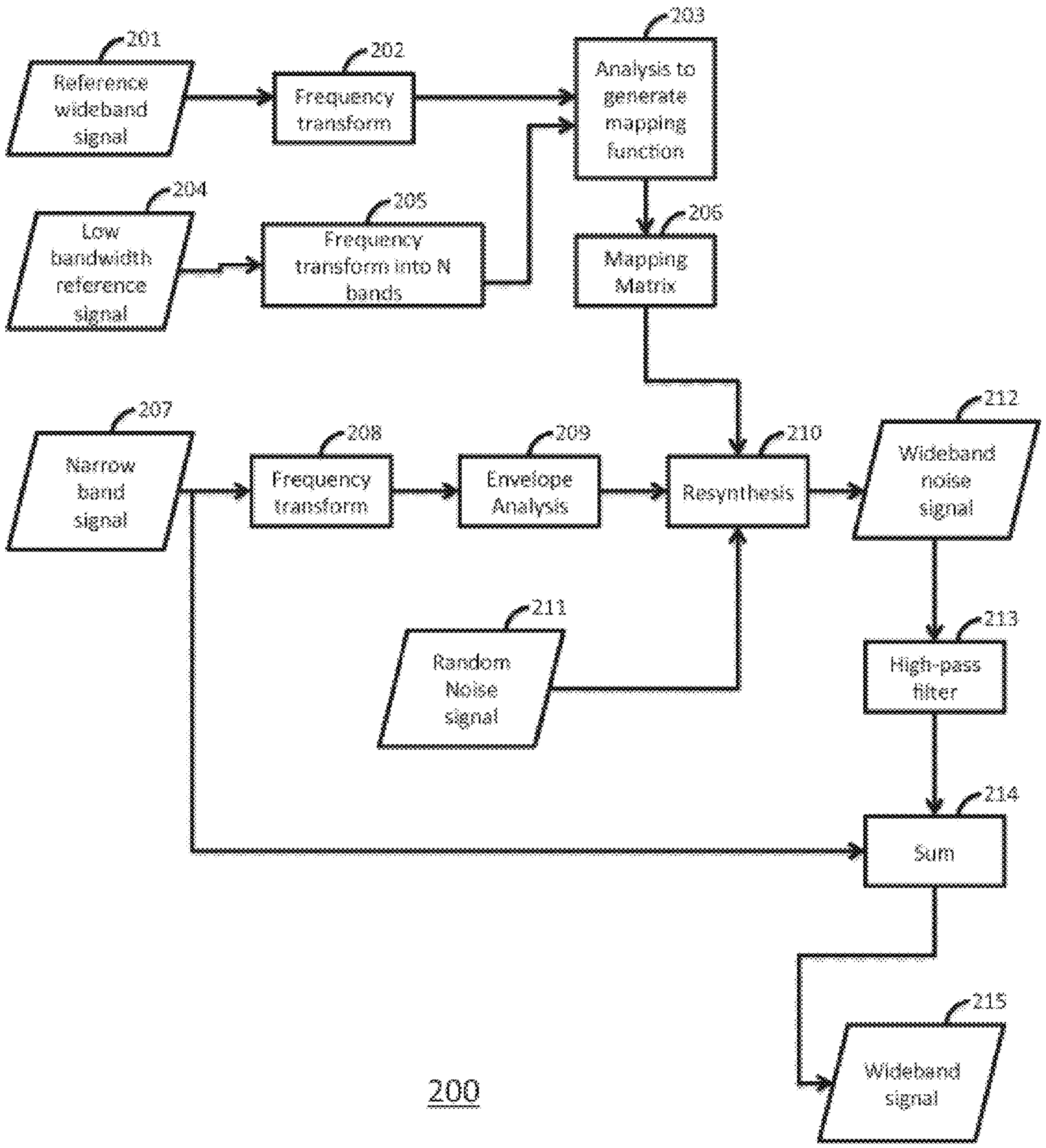
FIG. 2: Overview of Spectral Expansion System

300

METHOD AND DEVICE FOR SPECTRAL EXPANSION OF AN AUDIO SIGNAL

CROSS-REFERENCE TO RELATED APPLICATION(S)

This application is a continuation of U.S. patent application Ser. No. 16/783,624, filed 6 Feb. 2020, which is a continuation of and claims priority to U.S. patent application Ser. No. 16/047,612, which is a continuation of and claims priority to U.S. patent application Ser. No. 14/155,724 filed Jan. 15, 2014, now U.S. Pat. No. 10,043,535, which claims the benefit of U.S. Provisional Patent Application No. 61/752,569 filed Jan. 15, 2013 and further claims the benefit of U.S. Provisional Patent Application No. 61/920,321 filed Dec. 23, 2013. All of which are incorporated herein by reference in their entirety.

FIELD OF THE INVENTION

The present invention relates to audio enhancement for automatically increasing the spectral bandwidth of a voice signal to increase a perceived sound quality in a telecommunication conversation.

BACKGROUND

Sound isolating (SI) earphones and headsets are becoming increasingly popular for music listening and voice communication. SI earphones enable the user to hear an incoming audio content signal (be it speech or music audio) clearly in loud ambient noise environments, by attenuating the level of ambient sound in the user ear-canal.

SI earphones benefit from using an ear canal microphone (ECM) configured to detect user voice in the occluded ear canal for voice communication in high noise environments. In such a configuration, the ECM detects sound in the users ear canal between the ear drum and the sound isolating component of the SI earphone, where the sound isolating component is, for example, a foam plug or inflatable balloon. The ambient sound impinging on the ECM is attenuated by the sound isolating component (e.g., by approximately 30 dB averaged across frequencies 50 Hz to 10 kHz). The sound pressure in the ear canal in response to user-generated voice can be approximately 70-80 dB. As such, the effective signal to noise ratio measured at the ECM is increased when using an ear canal microphone and sound isolating component. This is clearly beneficial for two-way voice communication in high noise environments: where the SI earphone wearer with ECM can hear the incoming voice signal reproduced with an ear canal receiver (i.e., loudspeaker), with the incoming voice signal from a remote calling party. Secondly, the remote party can clearly hear the voice of the SI earphone wearer with the ECM even if the near-end caller is in a noisy environment, due to the increase in signal-to-noise ratio as previously described.

The output signal of the ECM with such an SI earphone in response to user voice activity is such that high-frequency fricatives produced by the earphone wearer, e.g., the phoneme /s/, are substantially attenuated due to the SI component of the earphone absorbing the air-borne energy of the fricative sound generated at the user's lips. As such, very little user voice sound energy is detected at the ECM above about 4.5 kHz and when the ECM signal is auditioned it can sound "muffled".

A number of related art discusses spectral expansion. Application US20070150269 describes spectral expansion of a narrowband speech signal. The application uses a "parameter detector" which for example can differentiate between a vowel and consonant in the narrowband input signal, and generates higher frequencies dependent on this analysis.

Application US20040138876 describes a system similar to US20070150269 in that a narrowband signal (300 Hz to 3.4 kHz) is analysis to determine in sibilants or non-sibilants, and high frequency sound is generated in the case of the former occurrence to generate a new signal with energy up to 7.7 kHz.

U.S. Pat. No. 8,200,499 describes a system to extend the high-frequency spectrum of a narrow-band signal. The system extends the harmonics of vowels by introducing a non-linearity. Consonants are spectrally expanded using a random noise generator.

U.S. Pat. No. 6,895,375 describes a system for extending the bandwidth of a narrowband signal such as a speech signal. The method comprises computing the narrowband linear predictive coefficients (LPCs) from a received narrowband speech signal and then processing these LPC coefficients into wideband LPCs, and then generating the wideband signal from these wideband LPCs

BRIEF DESCRIPTION OF THE DRAWINGS

FIG. 2 illustrates flow chart for a method for spectral expansion in accordance with an embodiment herein;

DETAILED DESCRIPTION

Figure 1A:
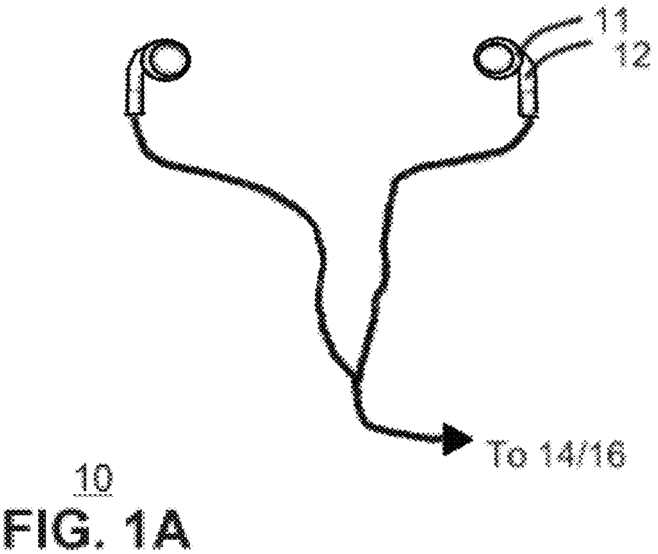
FIG. 1A illustrates a wearable system for spectral expansion of an audio signal in accordance with an exemplary embodiment.

The following description of at least one exemplary embodiment is merely illustrative in nature and is in no way intended to limit the invention, its application, or uses. Similar reference numerals and letters refer to similar items in the following figures, and thus once an item is defined in one figure, it may not be discussed for following figures.

In some embodiments, a system increases the spectral range of the ECM signal so that detected user-voice containing high frequency energy (e.g., fricatives) is reproduced with higher frequency content (e.g., frequency content up to about 8 kHz) so that the processed ECM signal can be auditioned with a more natural and "less muffled" quality.

"Voice over IP" (VOIP) telecommunications is increasingly being used for two-way voice communications between two parties. The audio bandwidth of such VOIP calls is generally up to 8 kHz. With a conventional ambient microphone as found on a mobile computing device (e.g., smart phone or laptop), the audio output is approximately linear up to about 12 kHz. Therefore, in a VOIP call between two parties using these conventional ambient microphones, made in a quiet environment, both parties will hear the voice of the other party with a full audio bandwidth up to 8 kHz. However, when an ECM is used, even though the signal to noise ratio improves in high noise environments, the audio bandwidth is less compared with the conventional ambient microphones, and each user will experience the received voice audio as sounding band-limited or muffled, as the received and reproduced voice audio bandwidth is approximately half as would be using the conventional ambient microphones.

Thus, embodiments herein expand (or extend) the bandwidth of the ECM signal before being auditioned by a remote party during high-band width telecommunication calls, such as VOIP calls.

The relevant art described above fails to generate a wideband signal from a narrowband signal based on a first analysis of a reference wideband speech signal to generate a mapping matrix (e.g., least-squares regression fit) that is then applied to a narrowband input signal and noise signal to generate a wideband output signal.

There are two things that are "different" about the approach in some of the embodiments described herein: One difference is that there is an intermediate approach between a very simple model (that the energy in the 3.5-4 kHz range gets extended to 8 kHz, say), and a very complex model (that attempts to classify the phoneme at every frame, and deploy a specific template for each case). Embodiments herein can have a simple, mode-less model, but where it has quite a few parameters, which can be learned from training data. The second significant difference is that the some of the embodiments herein use a "dB domain" to do the linear prediction.

Referring to FIG. 1A, a system 10 in accordance with a headset configuration is shown. In this embodiment, wherein the headset operates as a wearable computing device, the system 10 includes a first ambient sound microphone 11 for capturing a first microphone signal, a second ear canal microphone 12 for capturing a second microphone signal, and a processor 14/16 communicatively coupled to the second microphone 12 to increase the spectral bandwidth of an audio signal. As will be explained ahead, the processor 14/16 may reside on a communicatively coupled mobile device or other wearable computing device.

The system 10 can be configured to be part of any suitable media or computing device. For example, the system may be housed in the computing device or may be coupled to the computing device. The computing device may include, without being limited to wearable and/or body-borne (also referred to herein as bearable) computing devices. Examples of wearable/body-borne computing devices include head-mounted displays, earpieces, smartwatches, smartphones, cochlear implants and artificial eyes. Briefly, wearable computing devices relate to devices that may be worn on the body. Bearable computing devices relate to devices that may be worn on the body or in the body, such as implantable devices. Bearable computing devices may be configured to be temporarily or permanently installed in the body. Wearable devices may be worn, for example, on or in clothing, watches, glasses, shoes, as well as any other suitable accessory.

Although only the first 11 and second 12 microphone are shown together on a right earpiece, the system 10 can also be configured for individual earpieces (left or right) or include an additional pair of microphones on a second earpiece in addition to the first earpiece.

Figure 1B:
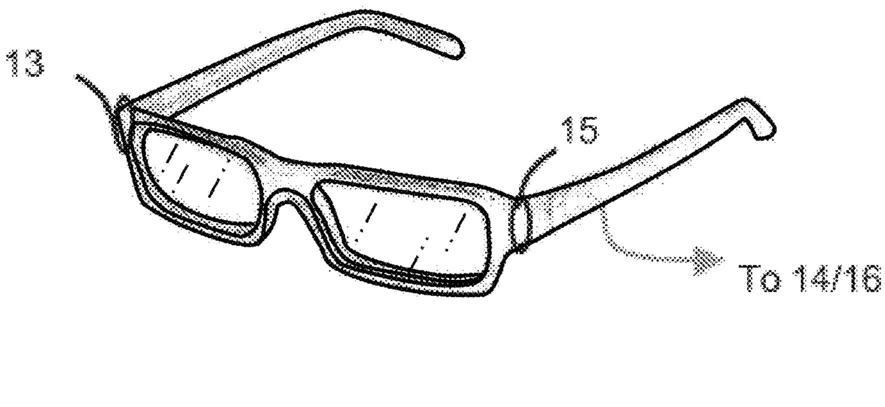
FIG. 1B illustrates another wearable system for spectral expansion of an audio signal in accordance with an exemplary embodiment.

Referring to FIG. 1B, the system in accordance with yet another wearable computing device is shown. In this embodiment, the system is part of a set of eyeglasses 20 that operate as a wearable computing device, for collective processing of acoustic signals (e.g., ambient, environmental, voice, etc.) and media (e.g., accessory earpiece connected to eyeglasses for listening) when communicatively coupled to a media device (e.g., mobile device, cell phone, etc.). In one arrangement, analogous to an earpiece with microphones but further embedded in eyeglasses, the user may rely on the eyeglasses for voice communication and external sound capture instead of requiring the user to hold the media device in a typical hand-held phone orientation (i.e., cell phone microphone to mouth area, and speaker output to the ears). That is, the eyeglasses sense and pick up the user's voice (and other external sounds) for permitting voice processing. An earpiece may also be attached to the eyeglasses 20 for providing audio and voice.

In the configuration shown, the first 13 and second 15 microphones are mechanically mounted to one side of eyeglasses. Again, the embodiment 20 can be configured for individual sides (left or right) or include an additional pair of microphones on a second side in addition to the first side.

Figure 1C:
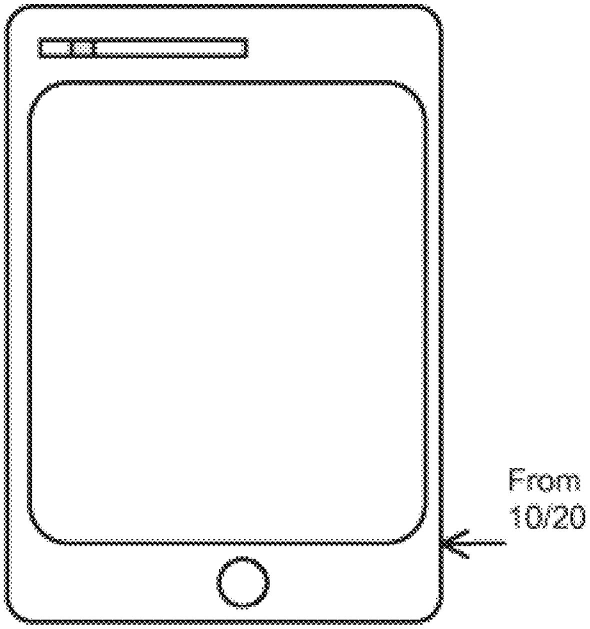
FIG. 1C illustrates a mobile device for coupling with the wearable system in accordance with an exemplary embodiment.
Figure 1D:
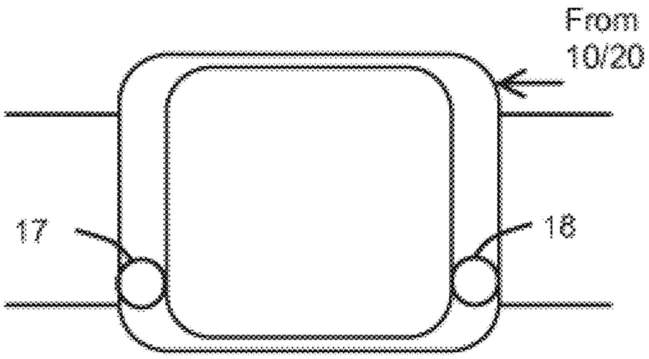
FIG. 1D illustrates another mobile device for coupling with the wearable system in accordance with an exemplary embodiment.

FIG. 1C depicts a first media device 14 as a mobile device (i.e., smartphone) which can be communicatively coupled to either or both of the wearable computing devices (10/20). FIG. 1D depicts a second media device 16 as a wristwatch device which also can be communicatively coupled to the one or more wearable computing devices (10/20). As previously noted in the description of these previous figures, the processor for updating the adaptive filter is included thereon, for example, within a digital signal processor or other software programmable device within, or coupled to, the media device 14 or 16.

With respect to the previous figures, the system 10 or 20 may represent a single device or a family of devices configured, for example, in a master-slave or master-master arrangement. Thus, components of the system 10 or 20 may be distributed among one or more devices, such as, but not limited to, the media device 14 illustrated in FIG. 1C and the wristwatch 16 in FIG. 1D. That is, the components of the system 10 or 20 may be distributed among several devices (such as a smartphone, a smartwatch, an optical head-mounted display, an earpiece, etc.). Furthermore, the devices (for example, those illustrated in FIG. 1A and FIG. 1B) may be coupled together via any suitable connection, for example, to the media device in FIG. 1C and/or the wristwatch in FIG. 1D, such as, without being limited to, a wired connection, a wireless connection or an optical connection.

Figure 5:
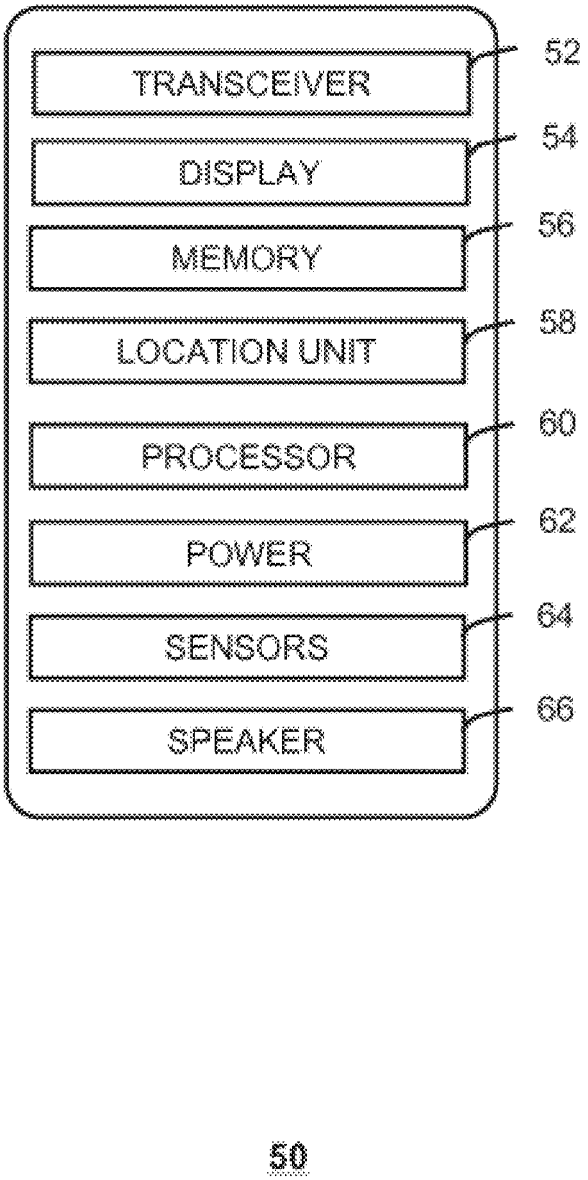
FIG. 5 depicts a block diagram of an exemplary mobile device or multimedia device suitable for use with the spectral enhancement system in accordance with an exemplary embodiment.

The computing devices shown in FIGS. 1C and 1D can include any device having some processing capability for performing a desired function, for instance, as shown in FIG. 5. Computing devices may provide specific functions, such as heart rate monitoring or pedometer capability, to name a few. More advanced computing devices may provide multiple and/or more advanced functions, for instance, to continuously convey heart signals or other continuous biometric data. As an example, advanced "smart" functions and features similar to those provided on smartphones, smartwatches, optical head-mounted displays or helmet-mounted displays can be included therein. Example functions of computing devices may include, without being limited to, capturing images and/or video, displaying images and/or video, presenting audio signals, presenting text messages and/or emails, identifying voice commands from a user, browsing the web, etc.

In one exemplary embodiment of the present invention, there exists a communication earphone/headset system connected to a voice communication device (e.g. mobile telephone, radio, computer device) and/or audio content delivery device (e.g. portable media player, computer device). Said communication earphone/headset system comprises a sound isolating component for blocking the users ear meatus (e.g. using foam or an expandable balloon); an Ear Canal Receiver (ECR, i.e. loudspeaker) for receiving an audio signal and generating a sound field in a user ear-canal; at least one ambient sound microphone (ASM) for receiving an ambient sound signal and generating at least one ASM signal; and an optional Ear Canal Microphone (ECM) for receiving a narrowband ear-canal signal measured in the user's occluded ear-canal and generating an ECM signal. A signal processing system receives an Audio Content (AC) signal from the said communication device (e.g. mobile phone etc) or said audio content delivery device (e.g. music player); and further receives the at least one ASM signal and the optional ECM signal. Said signal processing system processing the narrowband ECM signal to generate a modified ECM signal with increased spectral bandwidth.

In a second embodiment, the signal processing for increasing spectral bandwidth receives a narrowband speech signal from a non-microphone source, such as a codec or Bluetooth transceiver. The output signal with the increased spectral bandwidth is directed to an Ear Canal Receiver of an earphone or a loudspeaker on another wearable device.

Figure 1E:
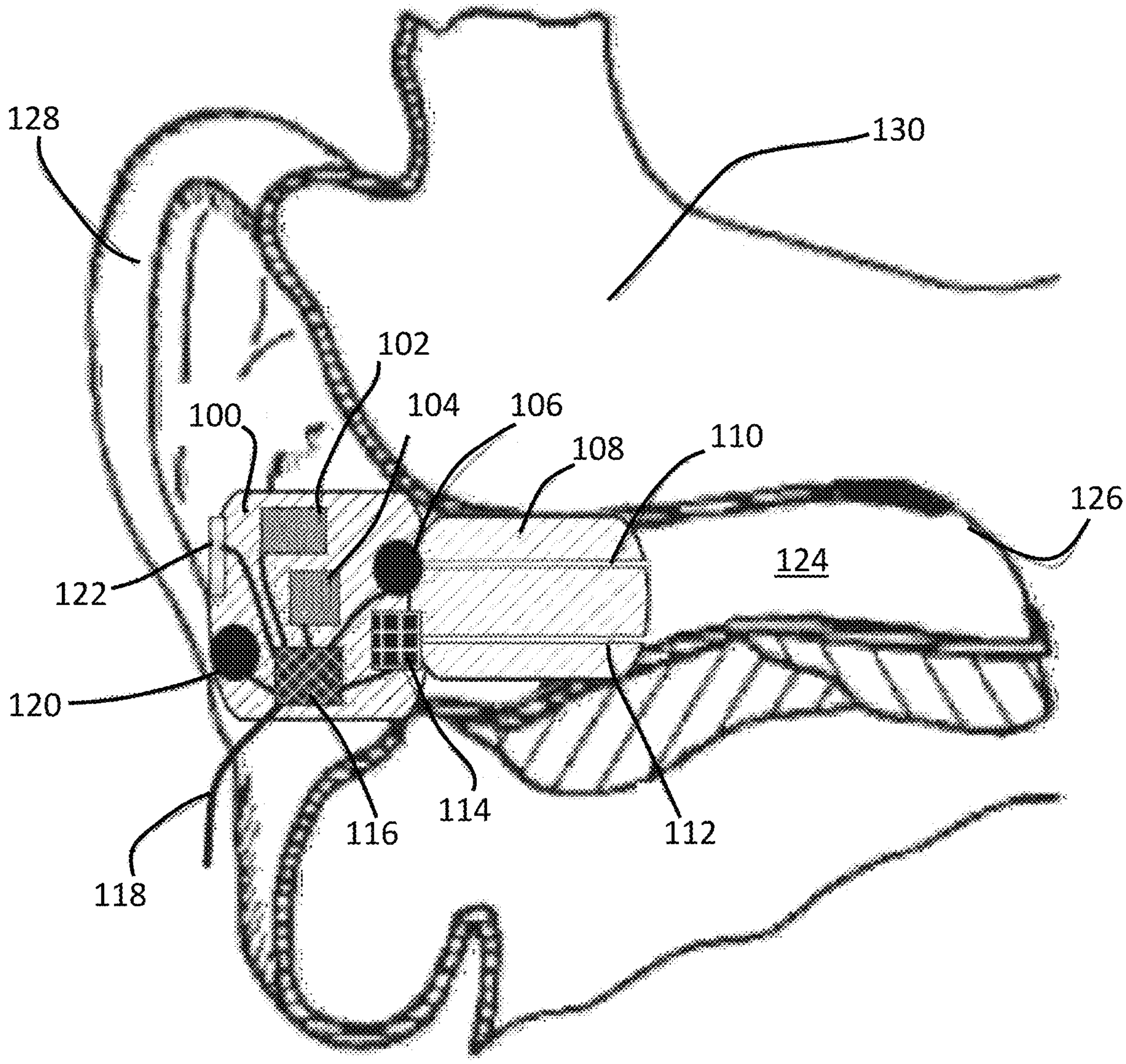
FIG. 1E illustrates an exemplary earpiece for use with the enhancement system in accordance with an exemplary embodiment.

FIG. 1E illustrates an earpiece as part of a system 40 according to at least one exemplary embodiment, where the system includes an electronic housing unit 100, a battery 102, a memory (RAM/ROM, etc.) 104, an ear canal microphone (ECM) 106, an ear sealing device 108, an ECM acoustic tube 110, a ECR acoustic tube 112, an ear canal receiver (ECR) 114, a microprocessor 116, a wire to second signal processing unit, other earpiece, media device, etc. (118), an ambient sound microphone (ASM) 120, a user interface (buttons) and operation indicator lights 122. Other portions of the system or environment can include an occluded ear canal 124 and ear drum 126.

The reader is now directed to the description of FIG. 1E for a detailed view and description of the components of the earpiece 100 (which may be coupled to the aforementioned devices and media device 50 of FIG. 5 for example), components which may be referred to in one implementation for practicing the methods described herein. Notably, the aforementioned devices (headset 10, eyeglasses 20, mobile device 14, wrist watch 16, earpiece 100) can also implement the processing steps of methods herein for practicing the novel aspects of spectral enhancement of speech signals.

FIG. 1E is an illustration of a device that includes an earpiece device 100 that can be connected to the system 10, 20, or 50 of FIG. 1A, 2A, or 5, respectively for example, for performing the inventive aspects herein disclosed. As will be explained ahead, the earpiece 100 contains numerous electronic components, many audio related, each with separate data lines conveying audio data. Briefly referring back to FIG. 1B, the system 20 can include a separate earpiece 100 for both the left and right ear. In such arrangement, there may be anywhere from 8 to 12 data lines, each containing audio, and other control information (e.g., power, ground, signaling, etc.)

As illustrated, the system 40 of FIG. 1E comprises an electronic housing unit 100 and a sealing unit 108. The earpiece depicts an electro-acoustical assembly for an in-the-ear acoustic assembly, as it would typically be placed in an ear canal 124 of a user. The earpiece can be an in the ear earpiece, behind the ear earpiece, receiver in the ear, partial-fit device, or any other suitable earpiece type. The earpiece can partially or fully occlude ear canal 124, and is suitable for use with users having healthy or abnormal auditory functioning.

The earpiece includes an Ambient Sound Microphone (ASM) 120 to capture ambient sound, an Ear Canal Receiver (ECR) 114 to deliver audio to an ear canal 124, and an Ear Canal Microphone (ECM) 106 to capture and assess a sound exposure level within the ear canal 124. The earpiece can partially or fully occlude the ear canal 124 to provide various degrees of acoustic isolation. In at least one exemplary embodiment, assembly is designed to be inserted into the user's ear canal 124, and to form an acoustic seal with the walls of the ear canal 124 at a location between the entrance to the ear canal 124 and the tympanic membrane (or ear drum). In general, such a seal is typically achieved by means of a soft and compliant housing of sealing unit 108.

Sealing unit 108 is an acoustic barrier having a first side corresponding to ear canal 124 and a second side corresponding to the ambient environment. In at least one exemplary embodiment, sealing unit 108 includes an ear canal microphone tube 110 and an ear canal receiver tube 112. Sealing unit 108 creates a closed cavity of approximately 5 cc between the first side of sealing unit 108 and the tympanic membrane in ear canal 124. As a result of this sealing, the ECR (speaker) 114 is able to generate a full range bass response when reproducing sounds for the user. This seal also serves to significantly reduce the sound pressure level at the user's eardrum resulting from the sound field at the entrance to the ear canal 124. This seal is also a basis for a sound isolating performance of the electro-acoustic assembly.

In at least one exemplary embodiment and in broader context, the second side of sealing unit 108 corresponds to the earpiece, electronic housing unit 100, and ambient sound microphone 120 that is exposed to the ambient environment. Ambient sound microphone 120 receives ambient sound from the ambient environment around the user.

Electronic housing unit 100 houses system components such as a microprocessor 116, memory 104, battery 102, ECM 106, ASM 120, ECR, 114, and user interface 122. Microprocessor (116) can be a logic circuit, a digital signal processor, controller, or the like for performing calculations and operations for the earpiece. Microprocessor 116 is operatively coupled to memory 104, ECM 106, ASM 120, ECR 114, and user interface 120. A wire 118 provides an external connection to the earpiece. Battery 102 powers the circuits and transducers of the earpiece. Battery 102 can be a rechargeable or replaceable battery.

In at least one exemplary embodiment, electronic housing unit 100 is adjacent to sealing unit 108. Openings in electronic housing unit 100 receive ECM tube 110 and ECR tube 112 to respectively couple to ECM 106 and ECR 114. ECR tube 112 and ECM tube 110 acoustically couple signals to and from ear canal 124. For example, ECR outputs an acoustic signal through ECR tube 112 and into ear canal 124 where it is received by the tympanic membrane of the user of the earpiece. Conversely, ECM 114 receives an acoustic signal present in ear canal 124 though ECM tube 110. All transducers shown can receive or transmit audio signals to a processor 116 that undertakes audio signal processing and provides a transceiver for audio via the wired (wire 118) or a wireless communication path.

FIG. 2 illustrates an exemplary configuration of the spectral expansion method 200. The method 200 for automatically expanding the spectral bandwidth of a speech signal can comprise the steps of:

Step 1. A first training step generating a "mapping" (or "prediction") matrix 206 based on the analysis 203 of a reference wideband signal 201 and a reference narrowband signal 204. The mapping matrix is a transformation matrix to predict high frequency energy from a low frequency energy envelope. In one embodiment a frequency transform 202 is performed on the reference wideband signal 201 and a frequency transform 205 into N Bands is performed on the low bandwidth reference signal 204. In one exemplary configuration, the reference wideband and narrowband signals are made from a simultaneous recording of a phonetically balanced sentence made with an ambient microphone located in an earphone and an ear canal microphone located in an earphone of the same individual (i.e. to generate the wideband and narrowband reference signals, respectively).

Step 2. Generating an energy envelope analysis 209 of an input narrowband audio signal 207. In one embodiment, the narrowband audio signal 207 is frequency transformed at 208.

Step 3: Generating at 210 a resynthesized noise signal by processing a random noise signal 211 with the mapping matrix 206 of step 1 and the envelope analysis 209 of step 2. The resynthesis at 201 provides a wideband noise signal 212.

Step 4: High-pass filtering at 213 the resynthesized noise signal 212 of step 3.

Step 5: Summing at 214 the high-pass filtered resynthesized noise signal with the original input narrowband audio signal 207 to provide a wideband signal 215.

Figure 3:
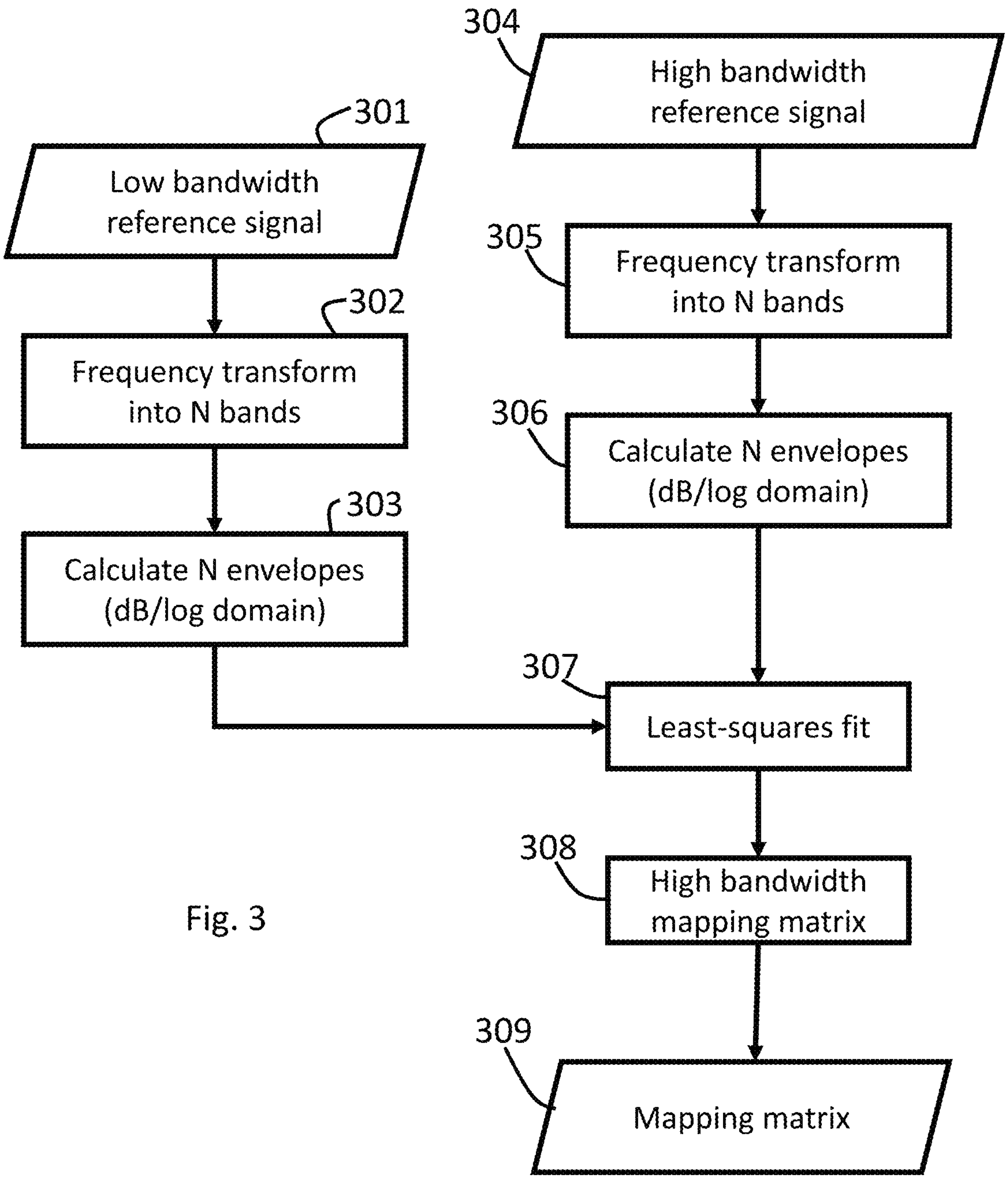
FIG. 3 illustrates a flow chart for a method for generating a mapping or prediction matrix in accordance with an embodiment herein.

FIG. 3 is an exemplary method 300 for generating the mapping (or "prediction") matrix 309. There are at least two things that are of note about the method: One is that we're taking an intermediate approach between a very simple model (that the energy in 3.5-4 kHz gets extended to 8 kHz, say), and a very complex model (that attempts to classify the phoneme at every frame, and deploy a specific template for each case). We have a simple, mode-less model, but it has quite a few parameters, which we learn from training data.

In the model, there are sufficient input channels for an accurate prediction, but not so many that we need a huge amount of training data, or that we end up being unable to generalize. In one embodiment, a low bandwidth reference signal 301 and a high bandwidth reference signal 304 are provided as inputs that are both respectively frequency transformed into N bands at 302 and 305 respectively.

The second approach or aspect of note of the method is that we use the "dB domain" (at 303 and 306 respectively) to do the linear prediction (this is different from the LPC approach).

The logarithmic dB domain is used since it has the ability to provide a good fit even for the relatively low-level energies. If you just do least squares at 307 on the linear energy, it puts all its modeling power into the highest 5% of the bins, or something, and the lower energy levels, to which human listeners are quite sensitive, are not well modeled (NB "mapping" and "prediction" matrix are used interchangeably). In one embodiment, a high bandwidth mapping matrix 308 is performed after the least-squares fit at 307 before providing the mapping matrix 309.

Figure 4:
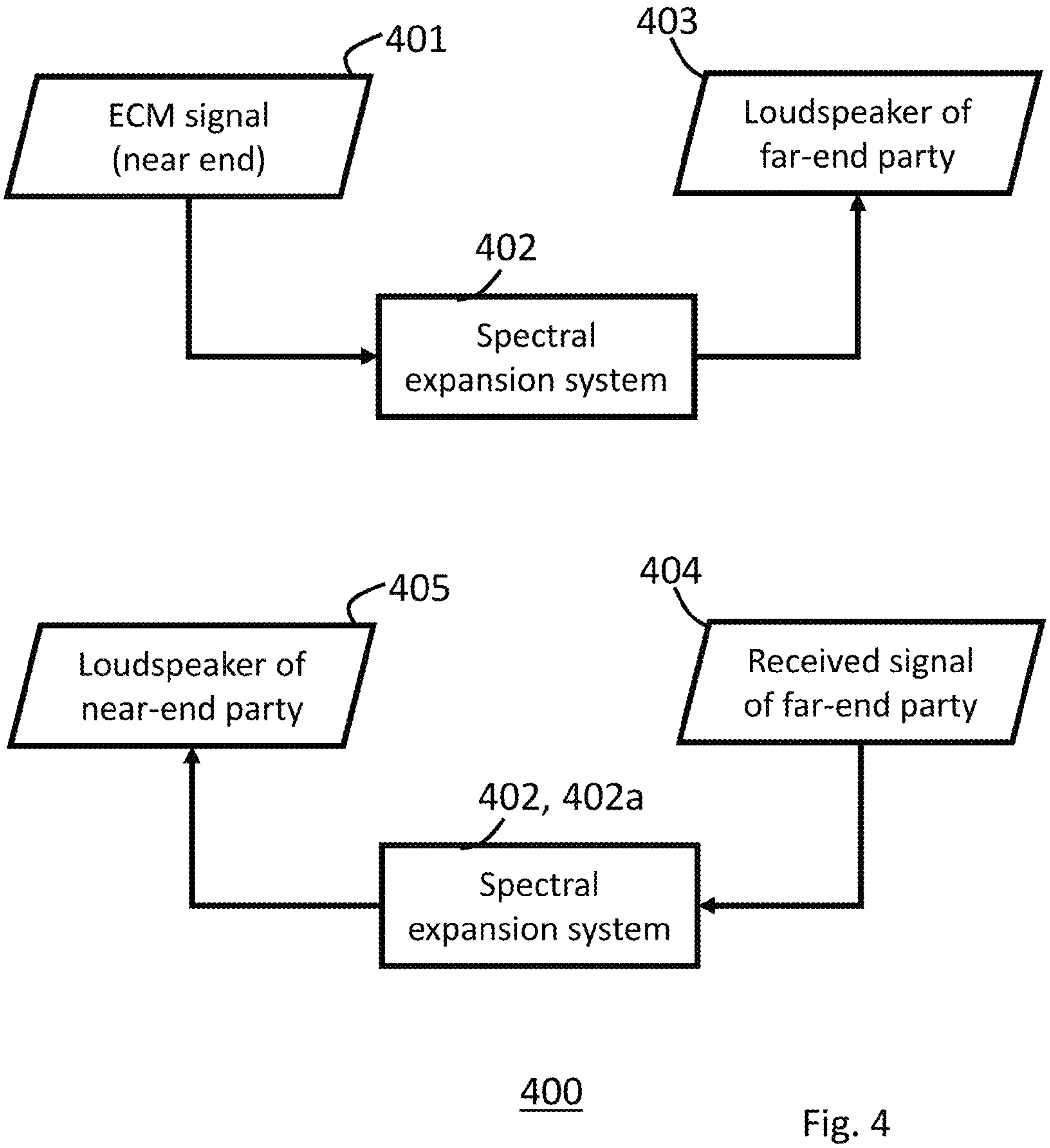
FIG. 4 illustrates use configurations for the spectral expansion system in accordance with an exemplary embodiment.

FIG. 4 shows an exemplary configuration of the spectral expansion system for increasing the spectral content of two signals:

1. A first outgoing signal 401 where the narrowband input signal is from an Ear Canal Microphone signal in an earphone (the "near end" signal), and the output signal from the spectral expansion system 402 is directed to a "far-end" loudspeaker 403 via a voice telecommunications system.

2. An incoming signal from the same spectral expansion system 402 or a second spectral expansion system **402*a* processes a received voice signal from a far-end system, e.g. a received voice system from a cell-phone. Here, the output of the spectral expansion system 402 or 402*a* is directed to the loudspeaker 405** in an earphone of the near-end party.

FIG. 5 depicts various components of a multimedia device 50 suitable for use for use with, and/or practicing the aspects of the inventive elements disclosed herein, for instance the methods of FIG. 2 or 3, though it is not limited to only those methods or components shown. As illustrated, the device 50 comprises a wired and/or wireless transceiver 52, a user interface (UI) display 54, a memory 56, a location unit 58, and a processor 60 for managing operations thereof. The media device 50 can be any intelligent processing platform with Digital signal processing capabilities, application processor, data storage, display, input modality or sensor 64 like touch-screen or keypad, microphones, and speaker 66, as well as Bluetooth, and connection to the internet via WAN, Wi-Fi, Ethernet or USB. This embodies custom hardware devices, Smartphone, cell phone, mobile device, iPad and iPod like devices, a laptop, a notebook, a tablet, or any other type of portable and mobile communication device. Other devices or systems such as a desktop, automobile electronic dash board, computational monitor, or communications control equipment is also herein contemplated for implementing the methods herein described. A power supply 62 provides energy for electronic components.

In one embodiment where the media device 50 operates in a landline environment, the transceiver 52 can utilize common wire-line access technology to support POTS or VoIP services. In a wireless communications setting, the transceiver 52 can utilize common technologies to support singly or in combination any number of wireless access technologies including without limitation Bluetooth™ Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, GSM/GPRS, EDGE, TDMA/EDGE, and EVDO. SDR can be utilized for accessing a public or private communication spectrum according to any number of communication protocols that can be dynamically downloaded over-the-air to the communication device. It should be noted also that next generation wireless access technologies can be applied to the present disclosure.

The power supply 62 can utilize common power management technologies such as power from USB, replaceable batteries, supply regulation technologies, and charging system technologies for supplying energy to the components of the communication device and to facilitate portable applications. In stationary applications, the power supply 62 can be modified so as to extract energy from a common wall outlet and thereby supply DC power to the components of the communication device 50.

The location unit 58 can utilize common technology such as a GPS (Global Positioning System) receiver that can intercept satellite signals and there from determine a location fix of the portable device 50.

The controller processor 60 can utilize computing technologies such as a microprocessor and/or digital signal processor (DSP) with associated storage memory such a Flash, ROM, RAM, SRAM, DRAM or other like technologies for controlling operations of the aforementioned components of the communication device.

It should be noted that the methods 200 in FIG. 2 or 3 are not limited to practice only by the earpiece device shown in FIG. 1E. Examples of electronic devices that incorporate multiple microphones for voice communications and audio recording or analysis, include, but not limited to:

a. Smart watches.
b. Smart "eye wear" glasses.
c. Remote control units for home entertainment systems.
d. Mobile Phones.
e. Hearing Aids.
f. Steering wheels.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device or portable device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions of the relevant exemplary embodiments. Thus, the description of the invention is merely exemplary in nature and, thus, variations that do not depart from the gist of the invention are intended to be within the scope of the exemplary embodiments of the present invention. Such variations are not to be regarded as a departure from the spirit and scope of the present invention.

For example, the spectral enhancement algorithms described herein can be integrated in one or more components of devices or systems described in the following U.S. Patent Applications, all of which are incorporated by reference in their entirety: U.S. patent application Ser. No. 11/774,965 entitled Personal Audio Assistant docket no. PRS-110-US, filed Jul. 9, 2007 claiming priority to provisional application 60/806,769 filed on Jul. 8, 2006; U.S. patent application Ser. No. 11/942,370 filed 2007 Nov. 19 entitled Method and Device for Personalized Hearing docket no. PRS-117-US; U.S. patent application Ser. No. 12/102,555 filed 2008 Jul. 8 entitled Method and Device for Voice Operated Control docket no. PRS-125-US; U.S. patent application Ser. No. 14/036,198 filed Sep. 25, 2013 entitled Personalized Voice Control docket no. PRS-127US; U.S. patent application Ser. No. 12/165,022 filed Jan. 8, 2009 entitled Method and device for background mitigation docket no. PRS-136US; U.S. patent application Ser. No. 12/555,570 filed 2013 Jun. 13 entitled Method and system for sound monitoring over a network, docket no. PRS-161US; and U.S. patent application Ser. No. 12/560,074 filed Sep. 15,2009 entitled Sound Library and Method, docket no. PRS-162US.

This disclosure is intended to cover any and all adaptations or variations of various embodiments. Combinations of the above embodiments, and other embodiments not specifically described herein, will be apparent to those of skill in the art upon reviewing the above description.

These are but a few examples of embodiments and modifications that can be applied to the present disclosure without departing from the scope of the claims stated below. Accordingly, the reader is directed to the claims section for a fuller understanding of the breadth and scope of the present disclosure.

We claim:

1. A method comprising:

receiving a command to initiate communication in a noisy environment;

retrieving a wideband reference signal and narrowband reference signal from memory, wherein the narrowband reference signal was generated from an ear canal microphone in a first earpiece, and the wideband reference signal was generated from an ambient sound microphone in the first earpiece, wherein the first earpiece is wirelessly connected to a first communication device;

receiving an ear canal signal from an ear canal microphone in the first earpiece;

generating a modified ear canal signal by spectrally expanding the ear canal signal using the wideband reference signal and the narrowband reference signal; and sending the modified ear canal signal to a second communication device.

2. The method comprising:

receiving a command to initiate communication in a noisy environment:

retrieving a wideband reference signal and narrowband reference signal from memory, wherein the narrowband reference signal was generated from an ear canal microphone in a first earpiece, and the wideband reference signal was generated from an ambient sound microphone in the first earpiece, wherein the first earpiece is wirelessly connected to a first communication device;

receiving an ear canal signal from an ear canal microphone in the first earpiece;

generating a modified ear canal signal by spectrally expanding the ear canal signal using the wideband reference signal and the narrowband reference signal;

receiving an ambient sound signal from an ambient sound microphone in the first earpiece;

generating a background noise signal from the ambient sound signal;

generating the command to initiate communication with a second communication device when a pressure level of the background noise signal is above a value; and sending the modified ear canal signal to the second communication device.

3. The method according to claim 2, wherein the pressure level is an averaged pressure level across frequencies from 50 Hz to 10 kHz.

4. The method according to claim 2, wherein the wideband reference signal was generated when the pressure level is below the value.

5. The method according to claim 4, wherein the narrowband reference signal was generated when the pressure level is below the value.

6. The method according to claim 1, wherein spectrally expanding the ear canal signal is performed by applying a mapping matrix, wherein the mapping matrix is generated using the wideband reference signal and the narrowband reference signal.

7. The method according to claim 6, wherein the mapping matrix is a transformation matrix to predict high frequency energy from a low frequency energy envelope.

8. The method according to claim 7 further comprising:

generating the low frequency energy envelope from the ear canal signal prior to generating a modified ear canal signal.

9. The method according to claim 1, wherein the ear canal signal was received from a remote communication device.

10. The method according to claim 1, wherein the command is initiated from a user interface.

11. A method comprising:

receiving a command to initiate communication in a noisy environment, wherein a first communication device which is connected wirelessly to a first earpiece, generates the command;

receiving from a second communication device, a wideband reference signal and narrowband reference signal, wherein the narrowband reference signal was generated from an ear canal microphone in a second earpiece wirelessly connected to the second communication system, and the wideband reference signal was generated from an ambient sound microphone in the second earpiece;

receiving an ear canal signal from the second communication system;

generating a modified ear canal signal by spectrally expanding the ear canal signal using the wideband reference signal and the narrowband reference signal; and sending the modified ear canal signal to a speaker of the first earpiece worn by a user.

12. The method according to claim 11, wherein spectrally expanding the ear canal signal is performed by applying a mapping matrix, wherein the mapping matrix is generated using the wideband reference signal and the narrowband reference signal.

13. The method according to claim 12, wherein the mapping matrix is a transformation matrix to predict high frequency energy from a low frequency energy envelope.

14. The method according to claim 13 further comprising:

generating the low frequency energy envelope from the ear canal signal prior to generating a modified ear canal signal.

15. The method according to claim 11, wherein the command is initiated from a user interface.

16. A method comprising:

receiving a command to initiate communication in a noisy environment, wherein a first communication device which is connected wirelessly to a first earpiece, generates the command;

receiving from a second communication device, a wideband reference signal and narrowband reference signal, wherein the narrowband reference signal was generated from an ear canal microphone in a second earpiece wirelessly connected to the second communication system, and the wideband reference signal was generated from an ambient sound microphone in the second earpiece;

receiving an ear canal signal from the second communication system;

generating a modified ear canal signal by spectrally expanding the ear canal signal using the wideband reference signal and the narrowband reference signal;

receiving an ambient sound signal from an ambient sound microphone in an earpiece worn by the user;

generating a background noise signal from the ambient sound signal;

generating the command to initiate communication when a pressure level of the background noise signal is above a value; and sending the modified ear canal signal to a speaker of the first earpiece worn by a user.

17. The method according to claim 16, wherein the pressure level is an averaged pressure level across frequencies from 50 Hz to 10 kHz.

* * * * *